United States Patent
Isogai et al.

(10) Patent No.: US 7,138,616 B2
(45) Date of Patent: Nov. 21, 2006

(54) COOKER FOR HIGH-FREQUENCY HEATING APPARATUS

(75) Inventors: Mamoru Isogai, Tenri (JP); Takahiko Yamasaki, Nara (JP); Mineko Suehiro, Nabari (JP); Satomi Uchiyama, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/432,940

(22) PCT Filed: Jan. 15, 2003

(86) PCT No.: PCT/JP03/00277

§ 371 (c)(1),
(2), (4) Date: May 28, 2003

(87) PCT Pub. No.: WO03/063663

PCT Pub. Date: Aug. 7, 2003

(65) Prior Publication Data

US 2004/0217114 A1     Nov. 4, 2004

(30) Foreign Application Priority Data

Jan. 31, 2002    (JP)    ............................. 2002-023044
May 24, 2002    (JP)    ............................. 2002-150324

(51) Int. Cl.
*H05B 6/80*    (2006.01)
*A47J 36/02*    (2006.01)

(52) U.S. Cl. ...................... 219/730; 219/732; 219/762; 99/DIG. 14; 426/243; 126/390

(58) Field of Classification Search ........ 219/730–735, 219/762, 763; 99/DIG. 14; 426/107, 109, 426/234, 243; 126/390
See application file for complete search history.

(56) References Cited

U.S. PATENT DOCUMENTS

| | | | |
|---|---|---|---|
| 3,777,099 A | 12/1973 | Levinson | |
| 4,398,077 A * | 8/1983 | Freedman et al. | .......... 219/729 |
| 4,496,815 A | 1/1985 | Jorgensen | |
| 4,701,585 A | 10/1987 | Stewart | |
| 5,045,660 A | 9/1991 | Levinson | |
| 6,040,564 A * | 3/2000 | Ueda et al. | .................. 219/682 |
| 6,097,017 A * | 8/2000 | Pickford | ..................... 219/725 |
| 6,608,292 B1 * | 8/2003 | Barnes | ........................ 219/730 |

FOREIGN PATENT DOCUMENTS

| | | | |
|---|---|---|---|
| CN | 1222838AN | 7/1999 | |
| JP | 62-158929 | * 7/1987 | |
| JP | 1-234718 | * 9/1989 | ................ 219/730 |

* cited by examiner

*Primary Examiner*—Philip H. Leung
(74) *Attorney, Agent, or Firm*—Pearne & Gordon LLP (57) ABSTRACT

A purpose of the present invention is to provide a cooker for high-frequency heating apparatus which can heat the inside of the subject to be heated by high-frequency heating, and can apply the scorch onto the surface of the subject to be heated. In the present invention, the cooker for high-frequency heating apparatus includes a high-frequency heating element and a saucer made of metal. In the cooker, the saucer is made of metal and is placed on the high-frequency heating element. Furthermore, a gap is provided between the high-frequency heating element and the saucer. Hereby, the inside of a subject to be heated is heated by high-frequency heating, and scorch can be applied onto a surface of the subject to be heated.

11 Claims, 6 Drawing Sheets

| H | a | b | P | TEMPERATURE (°C) | OUTPUT CONVERSION VALUE (W) |
|---|---|---|---|---|---|
| 0 | 0 | 0 | 0 | 120 | 288 |
| 1 | 10 | 10 | 20 | 140 | 252 |
| 2 | 10 | 10 | 20 | 160 | 210 |
| 3 | 10 | 10 | 20 | 200 | 186 |
| 4 | 10 | 10 | 20 | 210 | 180 |
| 5 | 10 | 10 | 20 | 200 | 186 |
| 6 | 10 | 10 | 20 | 205 | 192 |
| 8 | 10 | 10 | 20 | 160 | 192 |
| 10 | 10 | 10 | 20 | 140 | 192 |
| 4 | 8 | 12 | 20 | 220 | 180 |
| 4 | 10 | 10 | 20 | 210 | 180 |
| 4 | 12 | 8 | 20 | 200 | 186 |
| 4 | 14 | 6 | 20 | 190 | 192 |
| 4 | 6 | 10 | 16 | 200 | 186 |
| 4 | 8 | 10 | 18 | 215 | 180 |
| 4 | 10 | 10 | 20 | 210 | 180 |
| 4 | 12 | 10 | 22 | 205 | 180 |
| 4 | 10 | 10 | 20 | 210 | 180 |
| 4 | 10 | 15 | 25 | 200 | 180 |
| 4 | 10 | 20 | 30 | 180 | 192 |
| 4 | 10 | 30 | 40 | 160 | 210 |

COOKER FOR HIGH-FREQUENCY HEATING APPARATUS

TECHNICAL FIELD

The present invention relates to a cooker for high-frequency heating apparatus, which can heat the inside of an subject to be heated by high-frequency heating and apply scorch onto a surface of the subject to be heated.

BACKGROUND ART

Conventionally, as this type of cooker for high-frequency heating apparatus, there is, for example, a cooker as disclosed in Japanese Patent Laid-Open No. 2562/1998.

Figure 14:
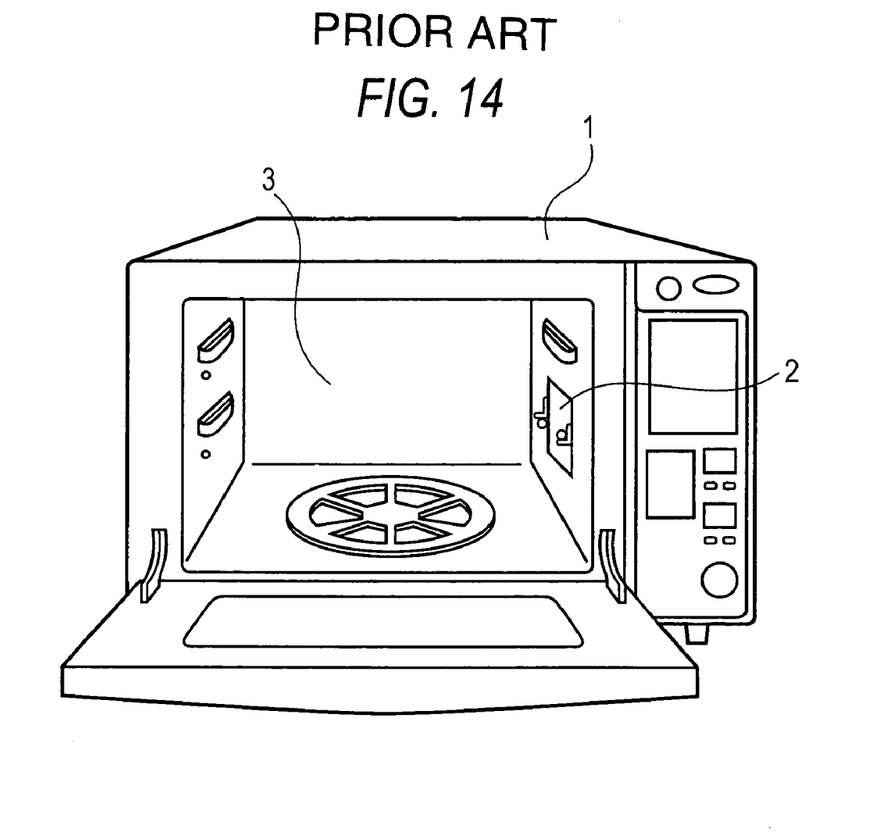
FIG. 14 is a front view showing a conventional high-frequency heating apparatus in perspective.

FIG. 14 is a front view showing a microwave oven 1 that is a is conventional high-frequency heating apparatus in perspective, which shows the constitution thereof.

According to the above related art, a microwave generated from a magnetron that is the high-frequency generating apparatus is supplied from a microwave supply port 2 formed on a side wall surface into a heating room 3.

Further, as a food table plate, a surface of a base made of metal such as iron is coated with a thin film-like microwave heating element.

Figure 15:
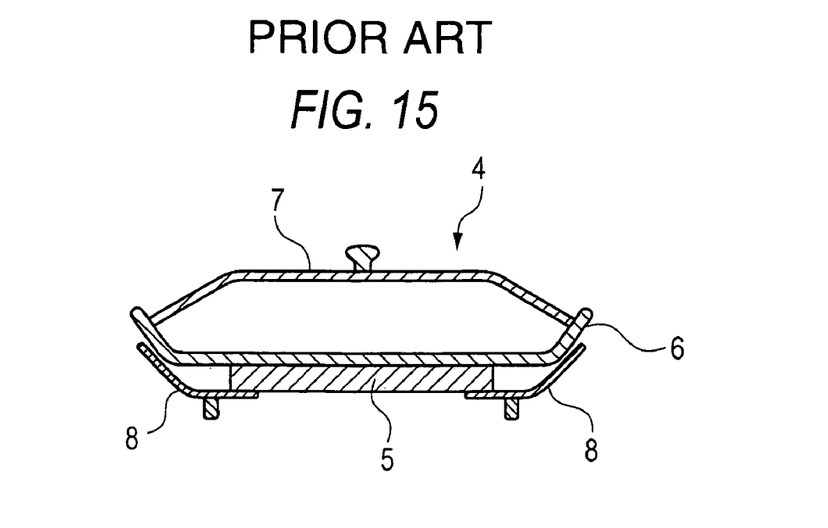
FIG. 15 is a sectional view showing the constitution of a conventional cooker for high-frequency heating apparatus.

Further, a cooker for high-frequency heating apparatus 4 as shown in FIG. 15 is also marketed. This cooker comprises a high-frequency heating element 5, a metal plate 6, a lid 7 made of metal, and base frame 8; and it is used, being put into the microwave oven.

The cooker for high-frequency heating apparatus 4 is used so that: the microwave is applied in the microwave oven in a state where the lid 7 is detached in order to perform preheating; after the surface of the metal plate 6 became hot sufficiently, a cooking object is put into the cooker; thereafter the microwave is further applied in a state where the lid 7 is attached thereby to apply scorch on a surface of the cooking object coming into contact with the metal plate 6. In case that the scorch is applied on the both sides of the cooking object, it is necessary to overturn the cooking object and heat it again.

However, in the conventional constitution, since the metal surface is coated with the microwave heating element, the heating element is close to the metal surface, so that the electric field in the vicinity of the heating element is weak, the amount of absorbing the microwave becomes small, and heating value becomes small, whereby there is a problem that the scorch is difficult to be applied.

Further, since the scorch cannot be simultaneously applied onto the both sides in the constitution of the marketed cooker for high-frequency heating apparatus 4, the cooking object must be overturned, so that it is a problem that much labor is required.

DISCLOSURE OF INVENTION

The invention has been made in order to solve the conventional problems, and its object is to provide a high-frequency heating apparatus which can heat efficiently the inside of the subject to be heated by high-frequency heating, and can apply the scorch onto the surface of the subject to be heated.

In order to solve the conventional problem, a cooker for high-frequency heating apparatus according to the invention comprises a high-frequency heating element and a metal-made saucer, in which the metal-made saucer is placed on the high-frequency heating element, and a gap is provided between the metal-made saucer and the high-frequency heating element.

Hereby, the inside of the subject to be heated is efficiently heated by high-frequency heating, and the scorch can be applied onto the surface of the subject to be heated.

A cooker for high-frequency heating apparatus according to the first or second aspect of the invention comprises a high-frequency heating element and a saucer made of metal, in which the saucer made of metal is placed on the high-frequency heating element, and a gap is provided between the high-frequency heating element and the saucer.

Hereby, the inside of a subject to be heated is efficiently heated by high-frequency heating, and scorch can be applied onto a surface of the subject to be heated.

According to the third aspect of the invention, unevenness is provided for the saucer according to the first or second aspect, and this unevenness provides the gaps between the high-frequency heating element and the saucer. Hereby, since the heat from the high-frequency heating element is easier to be transmitted to the metal-made saucer, the scorch is easier to be applied on the lower side of the subject to be heated.

According to the forth aspect of the invention, wherein by adjusting height, width, and pitch of the unevenness of the metal-made saucer, the heat generating amount can be adjusted.

According to the invention of the fifth aspect of the invention, a holder made of material that does not cause spark is provided for the saucer. Hereby, spark due to high-frequency waves between the metal portion of the saucer and the side surface of a heating room can be prevented.

According to the sixth aspect of the invention, resin is used as material of the holder. Hereby, the holder is more easily molded, and the spark due to high-frequency waves between the metal portion of the saucer and the side surface of a heating room can be prevented.

According to the seventh aspect of the invention, the saucer and the heating element is held by the holder in between. Hereby, falling-off of the heating element is prevented and simultaneously the spark due to high-frequency waves between the metal portion of the saucer and the side surface of a heating room can be prevented. According to the eighth aspect of the invention, the saucer and the high-frequency heating element are adhered with putty. Hereby, while the high-frequency heating element is being held by the saucer, heat generation due to high-frequency waves between the high-frequency heating element and the metal of the saucer is prevented.

The cooker for high-frequency heating apparatus according to the ninth aspect of the invention comprises a high-frequency heating element and a saucer made of metal, in which the high-frequency heating element is held at the lower portion of the saucer. Hereby, since the high-frequency heating element units with the saucer, it is not necessary to take out them individually, which is laborsaving.

According to the tenth aspect of the invention, the saucer is provided with a groove for storing therein juice flowing out from a subject to be heated. Hereby, since oil or the like that has flown out from the subject to be heated is removed, the scorch is applied more readily.

According to the eleventh aspect of the invention, a non-adhesive film is provided on a surface of the saucer. Hereby, the surface of the saucer is difficult to be stained.

According to the twelfth aspect of the invention, a heat absorbing film that is high in heat absorption rate is provided on a rear surface of the saucer. Hereby, since the heat generated from the high-frequency heating element is easier to be absorbed by the saucer, the scorch is easier to be applied.

According to the thirteenth aspect of the invention, the surface of the high-frequency heat generating film of the high-frequency heating element faces in the direction contacting with the saucer. Hereby, it is possible to prevent the high-frequency heat generating film from being damaged.

BEST MODE FOR CARRYING OUT THE INVENTION

Embodiments of the invention will be described below with reference to drawings.

(Embodiment 1)

Figure 1:
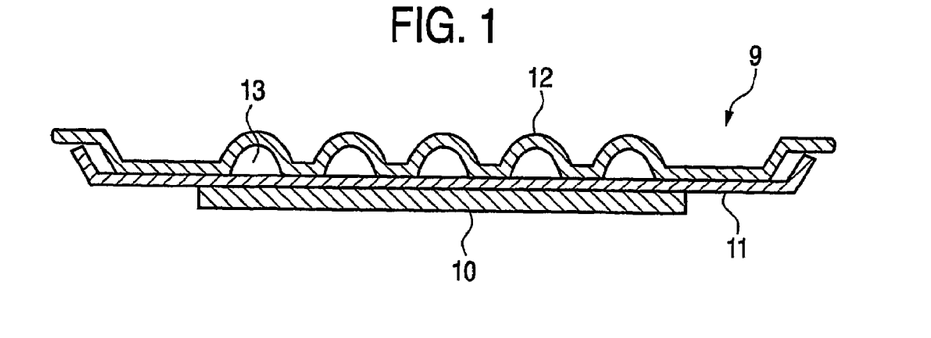
FIG. 1 is a sectional view showing the constitution of a cooker for high-frequency heating apparatus according to a first embodiment of the invention.

FIG. 1 is a sectional view showing the constitution of a cooker for high-frequency heating apparatus according to the invention.

In a cooker for high-frequency heating apparatus 9, a saucer 12 is placed on a high-frequency heating element 11 having a high-frequency heat generating film 10 on its rear surface. The saucer 12 has wavy unevenness, and gaps 13 are provided between the saucer 12 and the high-frequency heating element 11.

Figure 2:
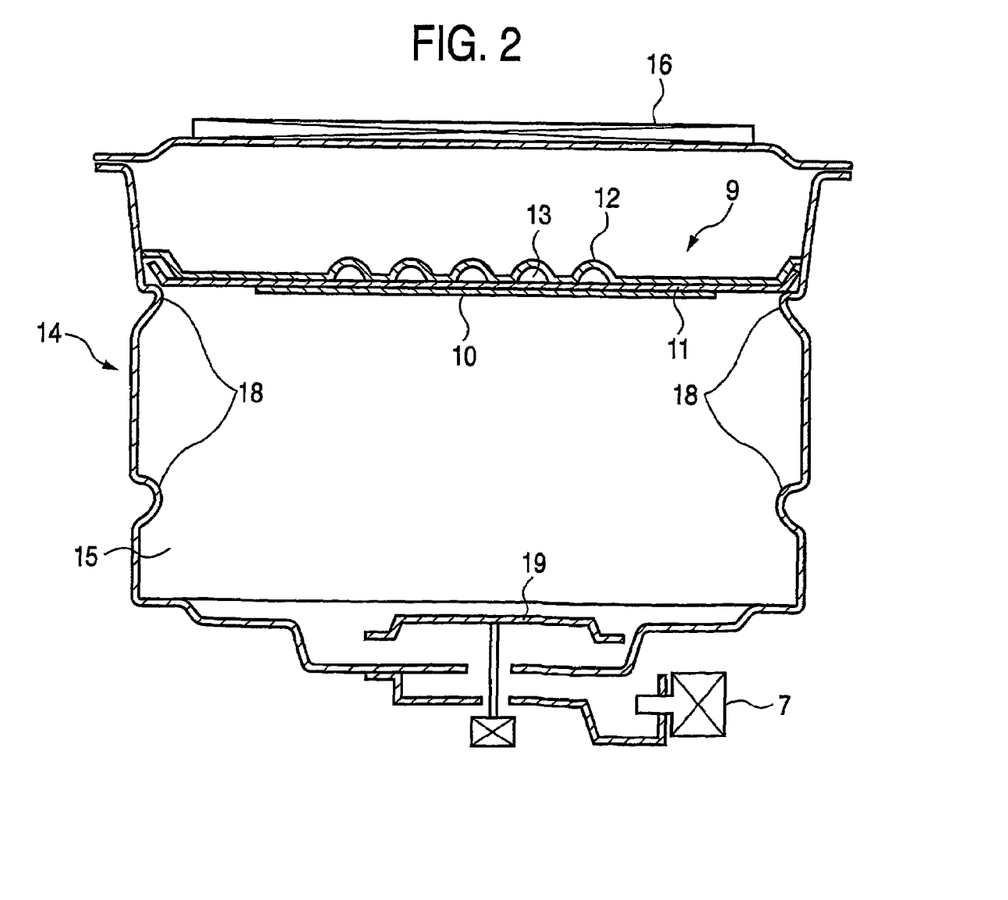
FIG. 2 is a sectional view showing the constitution in which the cooker for high-frequency heating apparatus of the invention is set into a high-frequency heating apparatus.

FIG. 2 is a sectional view showing the constitution in which the cooker for high-frequency heating apparatus according to the invention is set into a high-frequency heating apparatus.

A high-frequency heating apparatus 14 comprises a heating room 15 storing therein a subject to be heated; a heating unit 16 for performing heating by a heater, which is provided at the upper portion of the heating room; and a high-frequency generating unit 17 provided on the bottom surface of the heating room, which generates a high-frequency wave thereby to perform high-frequency heating. In the apparatus 14, the cooker for high-frequency heating apparatus 9 is arranged on a rail 18. The high-frequency wave generated from the high-frequency generating unit 17 is supplied by a high-frequency dispersing unit 19 from the downside to the heating room 15.

As the high-frequency heating element 11, a high-frequency heating element 11 made of ceramic is used in which a high-frequency heat generating film 9 made of nitride and boride is provided. As the saucer 12, a saucer having the wavy unevenness on its surface is used, in which a surface of an aluminum-coated steel sheet having gaps 13 is coated with fluorine and a rear surface thereof is coated with black heat-resistant coating.

In case that after preheating was performed for ten minutes in a state where the high-frequency heating element and the saucer were put into the apparatus 14, chicken dark meat used as a subject to be heated was heated for ten minutes simultaneously by an upper heater of 600 W that is the heating unit 16 and by high-frequency waves of 300 W, the inside and the both sides of the meat were heated properly. More particularly, scorch could be evenly applied on the both sides of the meat, so that the chicken dark meat has been roasted well. The water reduction rate is 13%, and the roasted chicken has the proper amount of juice. Further, without requiring labor of overturning the chicken dark meat, the inside of the meat could be heated and the scorch could be applied on the both sides of the meat.

We think that this is due to the following reason: Since the gaps 13 are provided, the distance between the high-frequency heat generating film 10 and the metal surface of the saucer 12 becomes large, whereby the strength of electric field on the high-frequency heat generating film 10 becomes high, and heat generation in the high-frequency heat generating film 10 becomes high; and compared with a case where there is no gap, the amount of the high-frequency wave turning to a surface of the saucer 12 is reduced, whereby without raising the water reduction rate of the chicken dark meat, the proper scorch can be applied onto the both sides.

Further, in case that the wavy unevenness was not provided for the surface of the saucer 12 and the gaps 13 were not provided, the scorch on the rear side was light, and many high-frequency waves were supplied to the chicken dark meat, so that the water reduction rate of the chicken dark meat became high (24%), the chicken dark meat contracted thereby to become hard, and the scorch was difficult to be applied onto the rear side.

We think that this is due to the following reason: Since the distance between the high-frequency heat generating film 10 and the metal surface of the saucer 12 is small, the strength of electric field on the high-frequency heat generating film 10 becomes low, heat generation in the high-frequency heat generating film 10 becomes low and the amount of the high-frequency wave turning to the surface of the saucer 12 becomes large, whereby the water reduction rate of the chicken dark meat becomes high, and the scorch becomes difficult to be applied onto the rear side.

Further, the difference in advantage between a case that there is the metal-made saucer 12 and a case that there is no metal-made saucer 12, and the difference in advantage between a case that there is the gap 13 and a case that there is no gap 13 were compared using water heated by the above high-frequency heating apparatus 4. The comparison was performed under the condition where water of 10° C. and 100 ml was heated at 1000 W for 10 seconds.

In case that there was no metal-made saucer, water temperature rose by 5.7° C. Calculated in terms of outputs, 342 W was supplied to the water.

In case that there was the metal-made saucer and there was no gap, water temperature rose by 4.7° C. Calculated in terms of outputs, 282 W was supplied to the water.

In case that there was the metal-made saucer and there was the gap, water temperature rose by 3.0° C. Calculated in terms of outputs, 180 W was supplied to the water.

On the other hand, in case that there was no metal-made saucer, the temperature at the bottom of the high-frequency heating element rose from 23° C. to 30° C., that is, it rose by 7° C.

In case that there was the metal-made saucer and there was no gap, the temperature at the bottom of the high-frequency heating element rose from 23° C. to 25° C., that is, it rose by 2° C.

In case that there was the metal-made saucer and there was the gap, the temperature at the bottom of the high-frequency heating element rose from 23° C. to 34° C., that is, it rose by 11° C.

From the above description, it is found that: when only the high-frequency heating element is used as the saucer and the high-frequency heating is performed, more high-frequency waves are supplied to the subjected to be heated than in case that there is the metal-made saucer.

Further, even when the metal-made saucer is placed on the high-frequency heating element, in case that there is no gap, the temperature of the high-frequency heating element does not rise. Namely, it is found that the high-frequency heating element is difficult to be heated in this case and more high-frequency waves are supplied than in case that there is the gap. We think that this causes meat contraction in case of the chicken dark meat, because the many high-frequency waves are supplied to the chicken dark meat though the lower side is scorched.

Further, it is found that by providing the gaps for the metal-made saucer, the amount of the high-frequency waves supplied to the subject to be heated becomes smaller than in case that there is no gap. We think that this gap causes the chicken dark meat to be heated properly without meat contraction and to receive the scorch.

Further, in this example, heater heating and high-frequency heating were simultaneously performed. However, they may be performed individually, or the simultaneous heating and the individual heating may be repeated.

Further, compared with a case where the output port of the microwave is positioned on the side surface, in case that it is positioned on the downside, unevenness in heating is smaller.

Regarding the rail 18, in case that it is arranged longer in the depth direction, a gap between the saucer 12 and the side wall surface becomes smaller, and the high-frequency wave supplied from the downside turns hardly to the upside of the saucer 12, so that the downside of the subject to be heated is more easily scorched.

Regarding the arrangement and constitution of the saucer 12, in order to divide the heating room into up and down portions, the outline of the saucer is formed so that the gap between the saucer and the side wall surface of the heating room and the gap between the saucer and a door for closing the heating room become small, whereby the high-frequency wave supplied from the downside turns hardly to the upside of the saucer, the amount of microwaves supplied to the high-frequency heating element becomes large, and the downside of the subject to be heated is more easily scorched.

As the heating unit 16, in addition to a tube heater, a sheath heater, or the like, a heater using hot wind may be used. Further, though the high-frequency heating element 11 has the high-frequency heat generating film 10 on its rear surface, it itself may be formed of ceramic that generates heat by the high-frequency wave.

On the high-frequency dispersing unit 19 located downward, a plate made of ceramic, which is not shown in FIG. 1, is provided at the bottom of the heating room, and it can be used as a table on which an subject to be heated such as a cooking object is placed at the high-frequency heating time. Hereby, the cooking object does not splash on the high-frequency dispersing apparatus 19.

Though the aluminum-coated steel sheet is used in the metal-made saucer 10, any metals that do not transmit the high-frequency wave can be used, for example, stainless; aluminum; aluminum alloy; various coated steel sheet such as a galvanized steel sheet, an aluminum zinc alloy coated steel sheet, a copper coated steel sheet, and the like; a cold-rolled steel sheet; clad material; or the like.

Though the aluminum-coated steel sheet is used in the metal-made saucer 10, material reflecting the high-frequency wave on its surface can be also used, for example, ceramic base having a high-frequency reflection layer provided by metal coating, metal evaporation, or the like.

Though as the high-frequency heating element 8, nitride and boride are used, metal oxide such as tin oxide, indium oxide or the like, and composite oxide can be also used.

(Embodiment 2)

Figure 3:
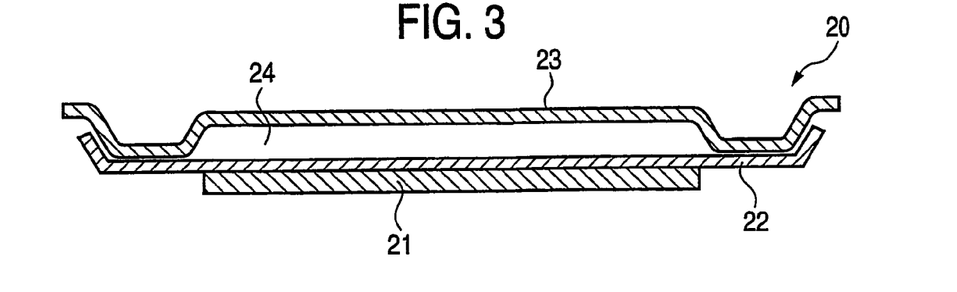
FIG. 3 is a sectional view showing the constitution of a cooker for high-frequency heating apparatus according to a second embodiment of the invention.

FIG. 3 is a sectional view showing the constitution of a cooker for high-frequency heating apparatus according to a second embodiment.

In FIG. 3, In a cooker for high-frequency heating apparatus 20, a gap 24 is provided between a high-frequency heating element 22 having a high frequency heat generating film 21 and a saucer 23 made of metal.

In case that the cooker for high-frequency heating apparatus 20 in this invention was set into the high-frequency heating apparatus 14 shown in the first embodiment, and chicken dark meat was heated, scorch could be applied onto the both sides of the meat. We think that this is due to the following reason: Since the distance between the high-frequency heat generating film 21 and the metal surface of the saucer 23 becomes large, the strength of electric field on the high-frequency heat generating film 21 becomes high, and heat generation in the high-frequency heat generating film 21 becomes high; and compared with a case where there is no gap, the amount of the high-frequency wave turning to a surface of the saucer 23 is reduced, whereby without raising the water reduction rate of the chicken dark meat, the proper scorch can be applied onto the both sides.

(Embodiment 3)

Figure 4:
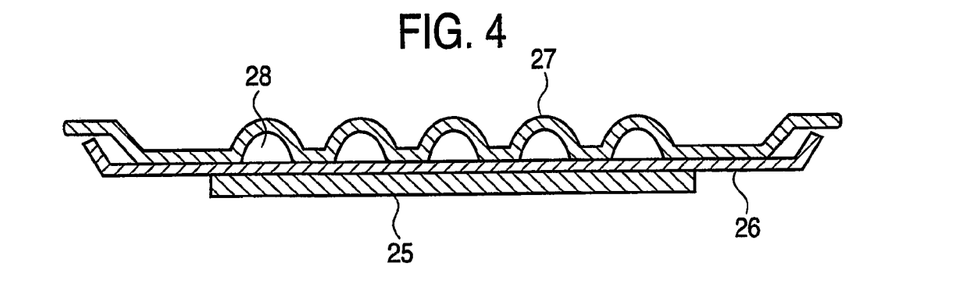
FIG. 4 is a sectional view showing the constitution of a cooker for high-frequency heating apparatus according to a third embodiment of the invention.

FIG. 4 is a sectional view showing the constitution of a cooker for high-frequency heating apparatus according to a third embodiment.

In FIG. 4, a portion between a high-frequency heating element 26 having a high-frequency heat generating film 25 and a saucer 27 made of metal is filled with ceramic material that is dielectrics to make a distance between the metal surface of the saucer 27 and the high-frequency heat generating film 25. Other constitution of the high-frequency heating apparatus is the same as that in the first embodiment.

In case that the cooker for high-frequency heating apparatus 20 of the invention was set into the high-frequency heating apparatus 14 shown in the first embodiment, and chicken dark meat was heated, scorch could be applied onto the both sides of the meat.

We think that this is due to the following reason: Since the distance between the high-frequency heat generating film 25 and the metal surface of the saucer 27 becomes large, the strength of electric field on the high-frequency heat generating film 25 becomes high, and heat generation in the high-frequency heat generating film 25 becomes high; and compared with a case where there is no gap, the amount of the high-frequency wave turning to a surface of the saucer 27 is reduced, whereby without raising the water reduction rate of the chicken dark meat, the proper scorch can be applied onto the both sides.

Further, in the constitution in which the portion between the high-frequency heating element and the saucer is filled with dielectrics, the high-frequency heating element 26 becomes heavy. On the other hand, since heat capacity becomes large, the cooker is difficult to cool in case of regular heating. Further, since the heat capacity is large, when preheating is performed once, the cooker is difficult to cool, so that scorch can be applied also in case of continuous use or tunnel type continuous high-frequency heating.

(Embodiment 4)

Figure 5:
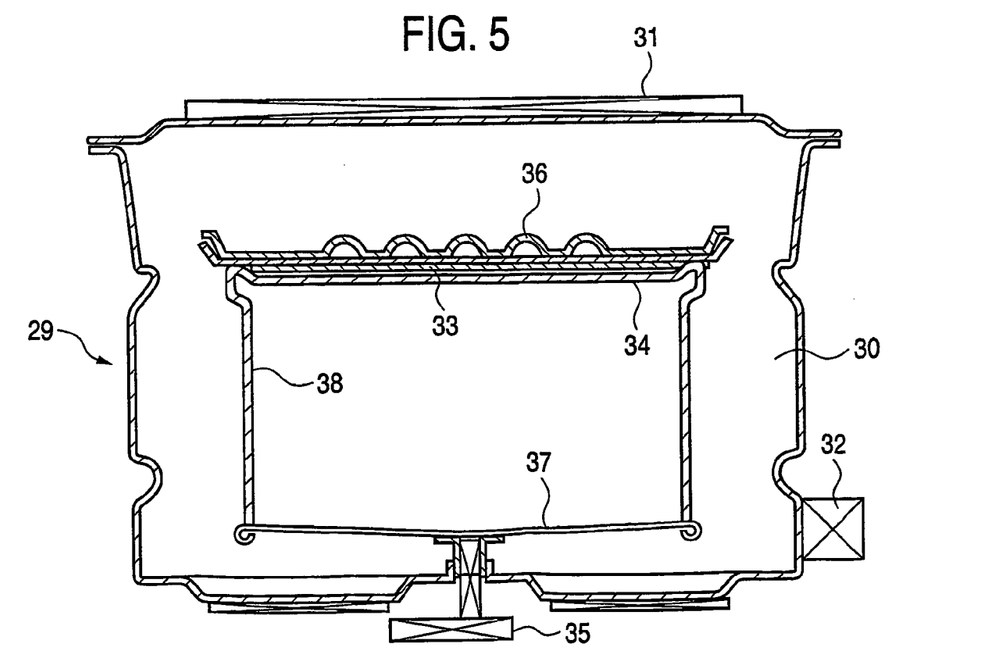
FIG. 5 is a sectional view showing the constitution in which the cooker for high-frequency heating apparatus according to the fourth embodiment of the invention is set into a high-frequency heating apparatus.

FIG. 5 is a sectional view showing the constitution of a cooker for high-frequency heating apparatus according to a fourth embodiment.

A high-frequency heating apparatus 29 comprises a heating room 30 storing therein a subject to be heated; a heating unit 31 for performing heating by a heater, which is provided at the upper portion of the heating room; a high-frequency generating unit 32 which generates a high-frequency wave thereby to perform high-frequency heating; a high-frequency heating element 34 having a high-frequency heat generating film 33 on its rear surface; a saucer 36 for placing the subject to be heated thereon, which is provided with gaps 35; and a setting net 38 for setting the saucer 36 on a turn table 37 for placing the saucer 36 into the heating room.

Under the above constitution, the high-frequency wave generated from the high-frequency generating unit 32 is supplied into the heating room 30. The turntable 37 turns by a motor 35, and the high-frequency heat generating film 33 is uniformly irradiated with the high-frequency waves, whereby the saucer 36 is uniformly heated. Therefore, the both sides of the subject to be heated are uniformly heated, and the scorch can be applied properly on the both sides.

(Embodiment 5)

Figure 6:
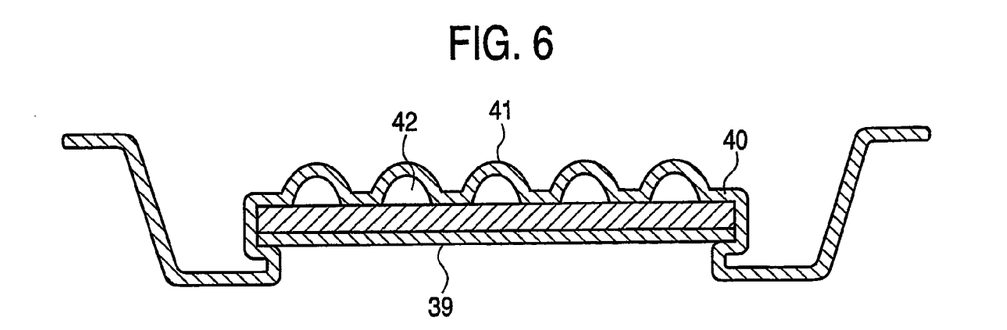
FIG. 6 is a sectional view showing the constitution of a cooker for high-frequency heating apparatus according to a fifth embodiment of the invention.

FIG. 6 is a sectional view showing the constitution of a cooker for high-frequency heating apparatus according to a fifth embodiment.

In FIG. 6, gaps 42 are provided between a high-frequency heating element 40 having a high-frequency heat generating film 39 and a saucer 41 made of metal thereby to hold the high-frequency heating element 40 on the rear surface of the saucer 41.

When the cooker in this embodiment was set into the high-frequency heating apparatus shown in the first embodiment and cooking was performed, the scorch applying performance similar to that in the first embodiment could be obtained. Further, since the high-frequency heating element 40 is held at the lower portion of the saucer 41, the high-frequency heating element 40 unites with the saucer 41, so that it is not necessary to take out them individually, which is laborsaving.

(Embodiment 6)

Figure 7:
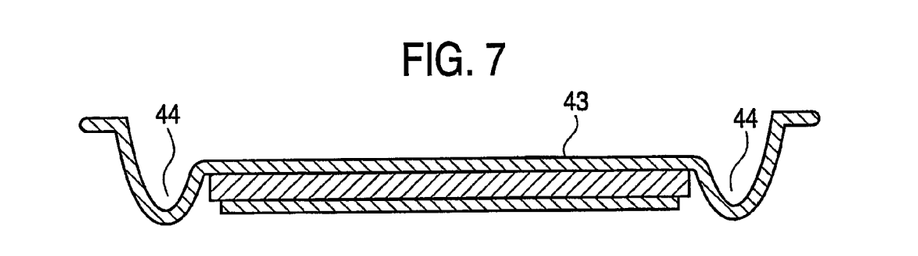
FIG. 7 is a sectional view showing the constitution of a cooker for high-frequency heating apparatus according to a sixth embodiment of the invention.

FIG. 7 is a sectional view showing the constitution of a cooker for high-frequency heating apparatus according to a sixth embodiment.

In FIG. 7, grooves 44 for storing therein juice flowing out from the subject to be heated are provided for a saucer made of metal. In FIG. 1, the saucer is viewed in front; and in FIG. 7, it is viewed from a side, in which the grooves 44 are provided. Namely, the grooves 44 are provided on the front and rear sides of the saucer 43.

When the cooker in this embodiment was set into the high-frequency heating apparatus shown in the first embodiment and cooking was performed, the scorch applying performance similar to that in the first embodiment could be obtained. Further, since the grooves 44 for storing therein juice flowing out from the subject to be heated are provided, oil that has flown out from the subject to be heated is removed, so that the scorch is readily applied, and also the subject to be heated is roasted crisply.

(Embodiment 7)

Figure 8:
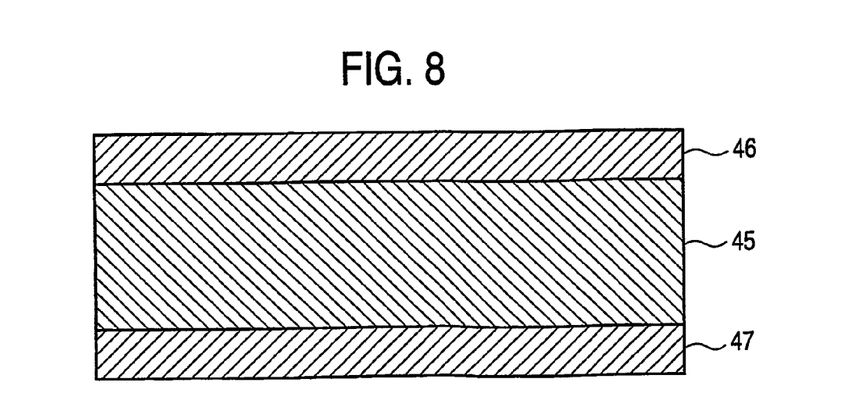
FIG. 8 is a sectional view showing the constitution of a main portion of a cooker for high-frequency heating apparatus according to a seventh embodiment of the invention.

FIG. 8 is a sectional view showing the constitution of a main part of a saucer used in a high-frequency heating apparatus according to a seventh embodiment.

In FIG. 8, a surface of a saucer member 45 made of metal is covered with a non-adhesive film 46, and a rear surface thereof is covered with a heat absorbing film 47 that is high in heat absorption rate.

By the above constitution, the surface of the saucer is difficult to be stained. Further, since the heat generated from the high-frequency heating element is easier to be absorbed by the saucer, the scorch is easier to be applied.

(Embodiment 8)

Figure 9:
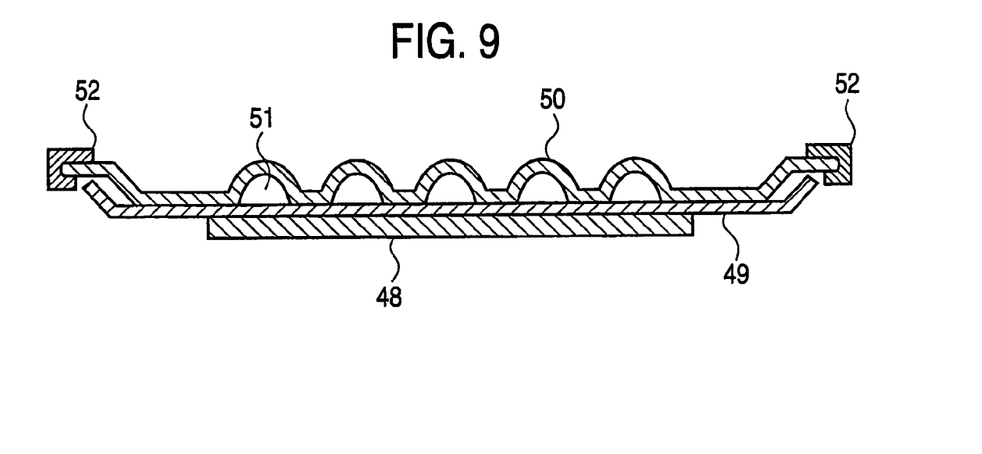
FIG. 9 is a sectional view showing the constitution of a main portion of a high-frequency heating apparatus according to an eighth embodiment of the invention.

FIG. 9 is a sectional view showing the constitution of a main portion of a saucer used in a high-frequency heating apparatus according to an eighth embodiment.

In FIG. 9, between a metal-made saucer 50 and a high-frequency heating element 49 having a high-frequency heat generating film 48, gaps 51 corresponding to the gaps 13 in the first embodiment are provided thereby to provide a distance between the metal surface of the saucer 50 and the high-frequency heat generating film 48. And, a holder 52 for preventing contact with a heating room side wall surface is provided on an end surface of the saucer 50. Other constitution in which the cooker for high-frequency heating apparatus is set into the high-frequency heating apparatus is the same as that in the first embodiment. By the above constitution, spark caused between the side wall surface of the heating room and the metal portion of the saucer at the high-frequency heating time can be prevented.

(Embodiment 9)

Figure 10:
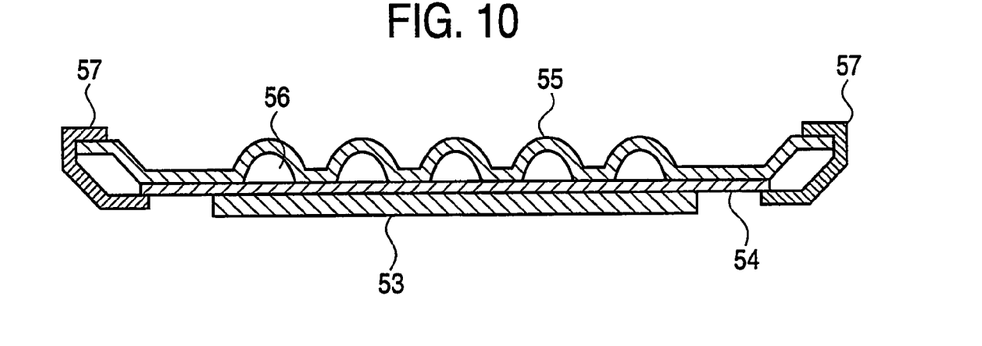
FIG. 10 is a sectional view showing the constitution of a main portion of a high-frequency heating apparatus according to a ninth embodiment of the invention.

FIG. 10 is a sectional view showing the constitution of a main portion of a saucer used in a high-frequency heating apparatus according to a ninth embodiment.

In FIG. 10, between a metal-made saucer 55 and a high-frequency heating element 54 having a high-frequency heat generating film 53, gaps 55 corresponding to the gaps 13 in the first embodiment are provided thereby to provide a distance between the metal surface of the saucer 55 and the high-frequency heat generating film 53. And, a holder 57 is provided so as to hold the saucer 55 and the high-frequency heating element 54 in between. Other constitution in which the cooker for high-frequency heating apparatus is set into the high-frequency heating apparatus is the same as that in the first embodiment. By the above constitution, falling-off of the heating element 54 can be prevented and contact of the high-frequency heating element with a side wall surface of a heating room such as a rail portion can be prevented thereby to prevent spark.

(Embodiment 10)

Figure 11:
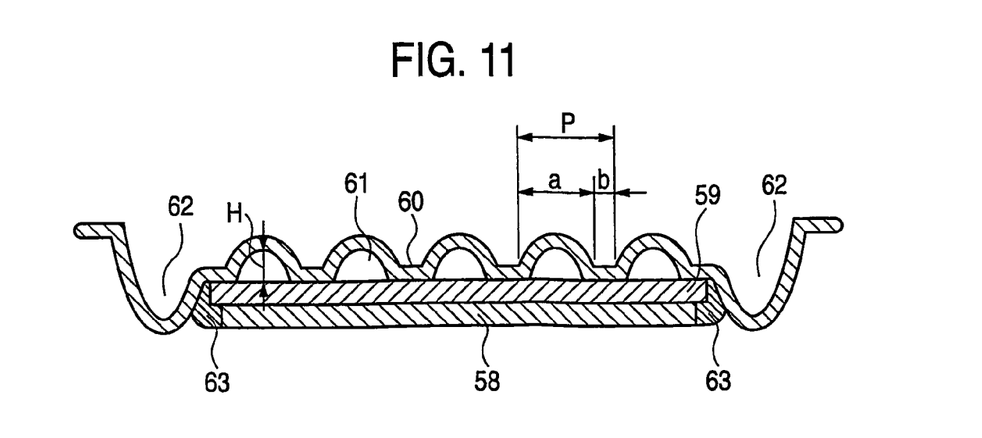
FIG. 11 is a sectional view showing the constitution of a main portion of a high-frequency heating apparatus according to a tenth embodiment of the invention.

FIG. 11 is a sectional view showing the constitution of a main portion of a high-frequency heating apparatus according to a tenth embodiment.

In FIG. 11, between a metal-made saucer 60 and a high-frequency heating element 59 having a high-frequency heat generating film 58, gaps 61 corresponding to the gaps 13 in the first embodiment are provided thereby to provide a distance between the metal surface of the saucer 60 and the high-frequency heat generating film 58. Further, a groove 62 for storing juice flowing out from a subject to be heated is provided for the metal-made saucer 60, and the saucer 60 and the high-frequency heating element 59 are adhered with putty 63. Other constitution in which the cooker for high-frequency heating apparatus is set into the high-frequency heating apparatus is the same as that in the first embodiment. In this case, the groove is provided at whole surroundings, whereby the high-frequency heating element 59 can be adhered at its whole surroundings with the putty 63. The adhesion with the putty 63 is not always unnecessary at the whole surroundings but it may be performed except a part, because the high-frequency heating element 59 and the saucer 60 can be held by adhesion. Hereby, heat generation due to the high-frequency wave between the high-frequency heating element 59 and the saucer 60 is prevented.

Further, the following relation is obtained: a+b=P, in which [a] is width 65 of a convex portion in an uneven portion of the saucer 60, [b] is width 66 of a concave portion therein, and [P] is a pitch 67. Further, the distance in the gap 61 between the high-frequency heating element 59 and the convex portion of the saucer 60 is taken as a height H 64.

Figure 12:
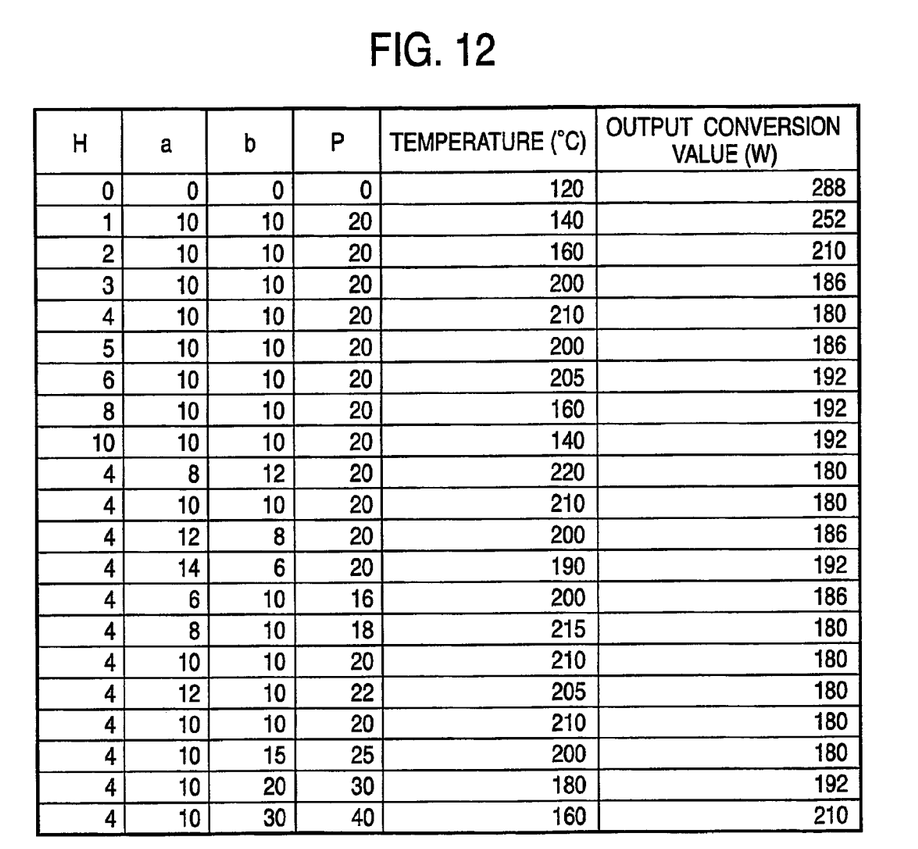
FIG. 12 is a diagram showing characteristic of heat generation of the high-frequency heating apparatus in the tenth embodiment of the invention.

FIG. 12 is a characteristic table of heat generation in case that the cooker for high-frequency heating apparatus according to the tenth embodiment has been set into the high-frequency heating apparatus.

Herein, as a base material of the high-frequency heating element 59, a liquid crystal glass having sheet thickness of 3 mm is used; and as the high-frequency heat generating film 58, a tin oxide film is used. When a resistant value of the tin oxide film is 400 $\Omega/cm^2$, in case that H is varied from 0 mm to 10 mm, and a, b, and P are varied from 0 mm to 40 mm, a maximum value of a surface temperature at the top of the convex portion of the saucer 53 when the saucer is heated by the high-frequency waves of 1000 W for 5 minutes is shown in FIG. 12. Further, an output conversion value is shown.

Seeing heat generation of the saucer 60 in case that H is varied from 0 mm to 10 mm, it is found that when $2 \leq H \leq 8$, the heat generation is high. It is found that when $3 \leq H \leq 6$, it is preferably high. Further, in case that a, b, P are varied, as b becomes smaller, the heat generation is lower. This reason is thought as follows: As the width of the concave portion becomes smaller, its contact surface with the high-frequency heating element 59 becomes smaller, so that heat is difficult to transmit to the saucer 60. Further, as P becomes larger, the heat generation becomes smaller. This reason is though as follows: Even if the contact surface becomes large, absolute quantity of the gap 61, that is, the number of the gaps becomes small, so that heat generating portions are reduced.

Further, the difference by the variation of H, a, b, P of the gap 61 was compared by heating water by high-frequency heating. The comparison was performed under the condition where water of 10° C. and 100 ml was heated at 1000 W for 10 seconds.

In case that there was no uneven portion in the saucer 60, that is, in case that H=0 mm, and a=b=P=0 mm, water temperature rose by 4.8° C. Calculated in terms of outputs, 288 W was supplied to the water.

In case that in the uneven portion of the saucer 60, H=4 mm, a=b=10, and P=20, water temperature rose by 3.0° C. Calculated in terms of outputs, 180 W was supplied to the water.

As shown in FIG. 12, it is found that: in case that the gap 61 has proper space, the high-frequency wave is difficult to turn to the upper surface of the saucer 60, so that correspondingly the high-frequency wave is more supplied to the high-frequency heating element 59. Further, even if turning of the high-frequency wave is reduced, in case that the height H becomes larger, the distance between the saucer and the high-frequency heating element becomes larger, and heat dissipation is performed, so that the heat is difficult to transmit to the saucer.

Further, it was difficult on metal working to make the height H larger than 10 mm. As the pitch P is made larger, the height H can be made larger. However, in order to apply uniform scorch on food, it was difficult to make the pitch large.

As described above, by adjusting the height of the gap 61, the widths of the concave portion and the convex portion, and the pitch, the heat generating temperature on the surface of the saucer 60 can be adjusted. This relation among the height, the widths of the concave and convex portions, and the pitch is obtained similarly also in the first embodiment.

(Embodiment 11)

Figure 13:
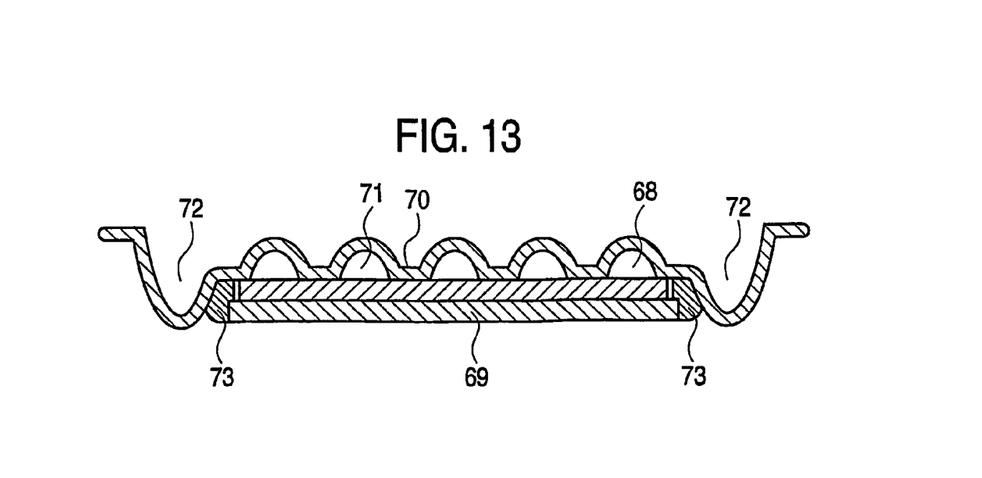
FIG. 13 is a sectional view showing the constitution of a main portion of a high-frequency heating apparatus according to an eleventh embodiment of the invention.

FIG. 13 is a sectional view showing the constitution of a main portion of a high-frequency heating apparatus according to an eleventh embodiment.

In FIG. 13, between a metal-made saucer 70 and a high-frequency heating element 69 having a high-frequency heat generating film 68, gaps 71 corresponding to the gaps 13 in the first embodiment are provided thereby to provide a distance between the metal surface of the saucer 70 and the high-frequency heat generating film 68. Further, a groove 72 for storing juice flowing out from a subject to be heated is provided for the metal-made saucer 70, and the saucer 70 and the high-frequency heating element 69 are adhered with putty 73. Other constitution in which the cooker for high-frequency heating apparatus is set into the high-frequency heating apparatus is the same as that in the first embodiment.

This embodiment is different from the tenth embodiment in that the high-frequency heat generating film 68 is provided on the side of the saucer 70. Hereby, it is possible to prevent the high-frequency heat generating film 68 from being damaged. However, the height of the gap 71, in order to obtain heat generation equivalent to that in the tenth embodiment, requires 5 mm to 9 mm. We think this reason as follows: Since the high-frequency heat generating film 68 is provided on the side of the saucer 70, the distance between the high-frequency heat generating film 68 and a convex portion is reduced by 3 mm sheet thickness of the high-frequency heating element 69; and in order to obtain the gap space similar to that in the tenth embodiment, this height is required.

The relation among the height, the widths of the concave and convex portions, and the pitch similar to that in the tenth embodiment is obtained. Namely, as the height, 5 mm to 9 mm is proper; in case that a, b, and P are varied, as b becomes smaller, heat generation is lower; and as P becomes larger, the heat generation becomes lower.

The present invention is based on Japanese Patent Applications No. 2002-023044 and No. 2002-150324, which are incorporated herein by references. While only certain embodiments of the invention have been specifically described herein, it will be apparent that numerous modifications may be made thereto without departing from the spirit and scope of the invention.

<Advantage of the Invention>

As described above, by adjusting the height of the gap 71, the widths of the concave portion and the convex portion, and the pitch, the heat generating temperature on the surface of the saucer 70 can be adjusted.

As described above, according to the first to thirteenth aspects of the invention, the inside of the subject to be heated is efficiently heated by high-frequency heating, and the scorch can be applied onto the surface of the subject to be heated.

The invention claimed is:

1. A cooker utensil for high-frequency heating apparatus comprising:
   a high-frequency heating element; and
   a saucer made of metal placed on the high-frequency heating element, said saucer having a first surface in contact at multiple areas with a first surface of said high-frequency heating element and said saucer having a second surface opposite said first saucer surface for placing a cooking object thereon;
   wherein gaps are provided from the first surface of said high-frequency heating element to the first surface of said saucer, said gaps located between the multiple contact areas for increasing the strength of the electric field in the vicinity of the heating element.

2. The cooker for high-frequency heating apparatus according to claim 1,
   wherein the height, width, and pitch of the gaps are adjusted to adjust the heat generating amount.

3. The cooker for high-frequency heating apparatus according to claim 1, further comprising:
   a holder provided for the saucer and made of material that does not causes spark.

4. The cooker for high-frequency heating apparatus according to claim 3,
   wherein the holder is made of resin.

5. The cooker for high-frequency heating apparatus according to claim 3,
   wherein the saucer and the heating element are held by the holder in between.

6. The cooker for high-frequency heating apparatus according to claim 1,
   wherein the saucer and the heating element are adhered with putty.

7. The cooker for high-frequency heating apparatus according to claim 1,
   wherein the high-frequency heating element is held at the lower portion of the saucer.

8. The cooker for high-frequency heating apparatus according to claim 1,
   wherein the saucer is provided with a groove for storing juice flowing out from a subject to be heated.

9. The cooker for high-frequency heating apparatus according to claim 1,
   wherein a non-adhesive film is provided on a surface of the saucer.

10. The cooker for high-frequency heating apparatus according to claim 1,
    wherein a film that is high in heat absorption rate is provided on a rear surface of the saucer.

11. The cooker for high-frequency heating apparatus according to claim 1, further comprising:
    a high-frequency heat generating film is provided on a surface of the high-frequency heating element;
    wherein the surface faces in the direction contacting with the saucer.

* * * * *